United States Patent
Kwon et al.

(10) Patent No.: US 9,693,253 B2
(45) Date of Patent: Jun. 27, 2017

(54) SYSTEMS AND METHODS FOR NEARBY CHANNEL MEASUREMENT

(71) Applicant: FutureWei Technologies, Inc., Plano, TX (US)

(72) Inventors: Younghoon Kwon, San Diego, CA (US); Yunsong Yang, San Diego, CA (US); Zhigang Rong, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 225 days.

(21) Appl. No.: 13/975,066

(22) Filed: Aug. 23, 2013

(65) Prior Publication Data

US 2014/0056163 A1    Feb. 27, 2014

Related U.S. Application Data

(60) Provisional application No. 61/693,116, filed on Aug. 24, 2012.

(51) Int. Cl.
*H04W 24/10* (2009.01)
*H04W 8/00* (2009.01)
(Continued)

(52) U.S. Cl.
CPC ........... *H04W 24/10* (2013.01); *H04W 8/005* (2013.01); *H04W 24/02* (2013.01); *H04L 1/1607* (2013.01);
(Continued)

(58) Field of Classification Search
USPC ........................................................ 370/252
See application file for complete search history.

(56) References Cited

U.S. PATENT DOCUMENTS

2008/0144493 A1* 6/2008 Yeh .................. H04W 52/50
                                                          370/230
2008/0279145 A1* 11/2008 Boariu ................. H04L 1/1614
                                                          370/329

(Continued)

OTHER PUBLICATIONS

Park, M., "Proposed Specification for TGah," IEEE 802.11-11/1137r12, Nov. 2012, 51 pages.

(Continued)

*Primary Examiner* — Yaotang Wang
(74) *Attorney, Agent, or Firm* — Slater Matsil, LLP

(57) ABSTRACT

System and method embodiments are provided for nearby channel measurement. The embodiments enable identifying stations that are hidden from one another. In an embodiment, a method in a wireless access point (AP) for identifying channel quality between a first and second group of STAs associated with the AP includes transmitting a first packet to the first group of STAs, wherein the first packet comprises information on measurement time window within which the first group of STAs is to measure a received signal; transmitting scheduling information to the second group of STAs, wherein the scheduling information indicates a time to send a reference packet during the measurement time window; and receiving a measurement report from the first group of STAs after the measurement time window, wherein measurement report includes information on received signal quality at the first group of STAs of a signal transmitted by the second group of STAs.

30 Claims, 7 Drawing Sheets

(51) Int. Cl.
*H04W 24/02* (2009.01)
*H04L 1/16* (2006.01)
*H04L 12/26* (2006.01)
*H04W 72/04* (2009.01)

(52) U.S. Cl.
CPC .......... *H04L 12/2697* (2013.01); *H04L 43/50* (2013.01); *H04W 72/0446* (2013.01)

(56) References Cited

U.S. PATENT DOCUMENTS

| | | | |
|---|---|---|---|
| 2009/0279445 A1* | 11/2009 | Nogami et al. | 370/252 |
| 2010/0110920 A1* | 5/2010 | Liu et al. | 370/252 |
| 2010/0317291 A1* | 12/2010 | Richardson | H04W 74/0825 455/63.1 |
| 2011/0292897 A1* | 12/2011 | Wu et al. | 370/329 |
| 2012/0157143 A1* | 6/2012 | Tsunekawa et al. | 455/509 |
| 2012/0300751 A1* | 11/2012 | Arai et al. | 370/336 |
| 2013/0128798 A1* | 5/2013 | Liu | 370/312 |

OTHER PUBLICATIONS

Park, M., "Proposed Specification for TGah," IEEE 802.11-11/1137r12, Jan. 2013, 58 pages.
Wong, E. et al., "Two-Hop Relay Function," IEEE802.11-12/1330r0, Nov. 2012, 27 pages.
Cheong, M., "TGah Functional Requirements and Evaluation Methodology Rev. 5," IEEE 802.11-11/0905r5, Jan. 2012, 24 pages.

* cited by examiner

SYSTEMS AND METHODS FOR NEARBY CHANNEL MEASUREMENT

CROSS-REFERENCE TO RELATED APPLICATIONS

The present application claims the benefit of U.S. Provisional Patent Application No. 61/693,116 filed Aug. 24, 2012 and entitled "System and Method for Nearby Channel Measurement," which is incorporated herein by reference as if reproduced in its entirety.

TECHNICAL FIELD

The present invention relates to a system and method for wireless communications, and, in particular embodiments, to a system and method for nearby channel measurement.

BACKGROUND

Currently Institute of Electrical and Electronics Engineers (IEEE) 802.11ah defines the local area network protocol, especially for sub-1 gigahertz (GHz) carrier frequency. Its main requirements include longer coverage area, up to 1 km, a physical (PHY) data rate of at least 100 kilobits per second (kbps), a maximum aggregate multi-station data rate of 20 megabits per second (Mbps), use of Orthogonal frequency-division multiplexing (OFDM) PHY modulation, and support for the number of associations beyond 2007 for outdoor applications. However, the hidden node problem is an issue for 802.11ah. As coverage area is wider (up to 1 kilometer (km) in outdoor applications), more and more stations (STAs) cannot hear each other due to limited transmit power and channel shadowing/fading.

SUMMARY

In accordance with an embodiment, a method in a wireless access point (AP) for identifying channel quality between a first group of stations (STAs) and a second group of STAs associated with the AP, wherein each group of STAs comprises at least one STA includes transmitting a first packet to the first group of STAs, wherein the first packet comprises information on measurement time window within which the first group of STAs is to measure a received signal; transmitting one or more second packets to the second group of STAs, wherein the second packet includes scheduling information for each of the second group of STAs to send a reference packet during the measurement time window, wherein only one STA is allocated to transmit at each transmission interval out of the second group of STAs within the measurement time window; and receiving a measurement report from the first group of STAs after the measurement time window, wherein measurement report includes information on received signal quality at the first group of STAs of a signal transmitted by at least one STA from the second group of STAs.

In accordance with another embodiment, an access point (AP) configured for identifying channel quality between a first group of stations (STAs) and a second group of STAs associated with the AP, wherein each group of STAs comprises at least one STA configured for wireless communication, wherein the AP includes a processor and a computer readable storage medium storing programming for execution by the processor, the programming including instructions to: transmit a first packet to the first group of STAs, wherein the first packet comprises information on a measurement time window within which the first group of STAs is to measure a received signal; transmit one or more second packets to the second group of STAs, wherein the second packet includes scheduling information for each of the second group of STAs to send a reference packet during the measurement time window, wherein only one STA is allocated to transmit at each transmission interval out of the second group of STAs within the measurement time window; and receive a measurement report from the first group of STAs after the measurement time window, wherein measurement report includes information on received signal quality at the first group of STAs of a signal transmitted by at least one STA from the second group of STAs.

In accordance with another embodiment, in a wireless communication system including at least one access point (AP) and more than one mobile station (STA) associated with the AP, a method of identifying channel quality among a group of STAs includes transmitting a first packet to the group of STAs, wherein the first packet includes scheduling information for each of the group of STAs to send a reference packet during a measurement time window, and an indication that all STAs need to measure received signal quality throughout the measurement time window, wherein only one STA is allocated to transmit at each transmission interval out of the group of STAs within the measurement time window; and receiving measurement report from the group of STAs after said measurement time window, wherein measurement report includes information on received signal quality at each of the group of STAs which was transmitted by a same group of STAs.

In accordance with another embodiment, a network component configured for of identifying channel quality among a group of mobile stations (STAs) includes a processor and a computer readable storage medium storing programming for execution by the processor, the programming including instructions to: transmit a first packet to the group of STAs, wherein the first packet includes scheduling information for each of the group of STAs to send a reference packet during a measurement time window, and an indication that all STAs need to measure received signal quality throughout the measurement time window, wherein only one STA is allocated to transmit at each transmission interval out of the group of STAs within the measurement time window; and receive measurement report from the group of STAs after said measurement time window, wherein measurement report includes information on received signal quality at each of the group of STAs which was transmitted by a same group of STAs.

In accordance with another embodiment, a method in a wireless enabled station (STA) for identifying channel quality between a first group of STAs and a second group of STAs associated with a wireless access point (AP) includes receiving at the wireless enabled STA a first packet from the AP, wherein the first packet comprises one of information on a measurement time window within which the first group of STAs is to measure a received signal and scheduling information for each of a second group of STAs to send a reference packet during the measurement time window, wherein only one STA is allocated to transmit at each transmission interval out of the second group of STAs within the measurement time window; measuring a sounding signal and transmitting a measurement report to the AP when the wireless enabled STA belongs to the first group; and transmitting a sounding signal at a time specified in the first packet when the wireless enabled STA belongs to the second group.

In accordance with another embodiment, a wireless enabled station (STA) configured for identifying channel quality between a first group of STAs and a second group of STAs associated with a wireless access point (AP) includes a processor and a computer readable storage medium storing programming for execution by the processor, the programming including instructions to: receive a first packet from the AP, wherein the first packet comprises one of information on a measurement time window within which the first group of STAs is to measure a received signal and scheduling information for each of a second group of STAs to send a reference packet during the measurement time window, wherein only one STA is allocated to transmit at each transmission interval out of the second group of STAs within the measurement time window; measure a sounding signal and transmitting a measurement report to the AP when the wireless enabled STA belongs to the first group; and transmit a sounding signal at a time specified in the first packet when the wireless enabled STA belongs to the second group.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
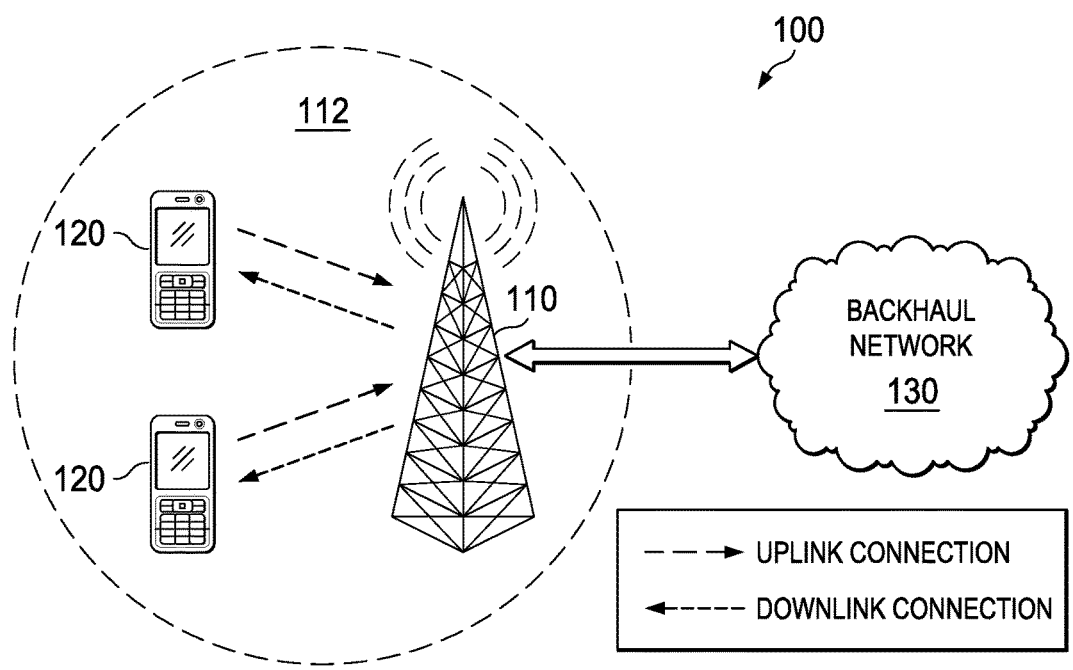
FIG. 1 illustrates a network for communicating data.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

To avoid a hidden node problem, IEEE 802.11Task Group (TG)-ah tries to spread out each STA's access opportunity over time. A restricted access window (RAW) is defined and only allowed STAs will access the window. An access point (AP) may indicate explicitly an allowed access slot for each STA. However, as there can be over 2000 STAs within the network and considering the delay requirement of each STA, the AP still may allocate multiple STAs at a given time slot, which can result in transmission collision due to the hidden node problem. Therefore, the success of these schemes depends on the fact that at least those STAs accessing the channel simultaneously are not hidden nodes of each other. However, there is no standard support to form a group of STAs who are not hidden nodes from each other. A hidden node is a STA whose transmissions are not apparent or visible to another STA due to limited transmission power and channel shadowing/fading.

Disclosed herein are systems and methods for determining which STAs are hidden from each other in an AP's coverage area. An embodiment measures a channel among multiple STAs such that the AP can have information of which STAs are hidden node to each other. An embodiment uses a polling window for group channel measurement. An embodiment groups users for hidden node avoidance. An embodiment provides channel measurement with less signaling overhead. Embodiments may be implemented in devices with Wi-Fi capabilities, such as sensors, smart phones, and tablets.

In an embodiment, two groups of STAs can be defined for channel measurement, a measurer, which is a STA that measures a channel, and a sounder, which is a STA that transmits a reference signal so that measurers can measure the received signal quality. In an embodiment, the measurers can also be sounders. An AP organizes a process in which a STA or a group of STAs can measure channel quality between nearby STAs. The AP indicates to a measurer or a group of measurers a time window for measurement. The AP assigns a restricted access window in which only sounders are allowed to transmit a reference packet, and designates transmission time for each sounder so that no more than one sounder will transmit each time interval. During the given time window, measurers measure the quality of the signal from each sounder. After the given time window, measurers report the measurement results to AP.

In an embodiment, a wireless AP is configured to identify channel quality between a first group of STAs and a second group of STAs associated with the AP, wherein each group of STAs comprises at least one STA configured for wireless communication. The AP transmits a first packet to the first group of STAs, wherein the first packet includes information on a measurement time window within which the first group of STAs is to measure a received signal. The AP also transmits one or more second packets to the second group of STAs. The second packet includes scheduling information for each of the second group of STAs to send a reference packet during the measurement time window. In an embodiment, the AP transmits only one packet to the first and second group of STAs, where the one packet includes information on the measurement time window and scheduling information for each of the second group to send a reference packet during the measurement time window as well as information indicating which of the two groups each STA belongs. Only one STA is allocated to transmit at each transmission interval out of the second group of STAs within the measurement time window. The AP receives a measurement report from the first group of STAs after the measurement time window. The measurement report includes information on received signal quality at the first group of STAs of a signal transmitted by at least one STA from the second group of STAs. In an embodiment, the AP transmits an acknowledgement packet in response to the polling packet, wherein the acknowledgement packet includes an indication of whether there is a buffered data that the AP is prepared to deliver.

In an embodiment, the information on the measurement time window in a first packet comprises identification of a serving access point and identification of the first group of STAs. In an embodiment, the information on measurement time window in a first packet also includes comprises an expected start time and a duration of the measurement time window. In an embodiment, the reference packet is a polling packet.

In an embodiment, transmitting one or more second packets includes setting a traffic indication bit for all STAs assigned in the measurement time window. In an embodiment, setting the traffic indication bit for each STA indicates that there is a buffered data that the AP is prepared to deliver to a corresponding STA. In an embodiment, a Traffic Indication Map (TIM) element is used for the traffic indication bit in an IEEE 802.11 protocol.

In an embodiment, the information on the measurement time window in a first packet includes an expected start time of the second packet and identification of the measurement time window within the second packet. In an embodiment, the information on the measurement time window in a first packet includes an indication of one specific time window is coming or a series of multiple time windows is coming. In an embodiment, if a series of multiple time windows is indicated, information on the measurement time window in a first packet further comprises an expected start time of an earliest coming second packet, a number of measurement windows, and a period of the measurement windows. In an embodiment, if a series of multiple time windows is indicated, information on measurement time window in a first packet further comprises an expected start time of and a duration of each of the measurement time window.

In an embodiment, the information on the measurement time window in a first packet further comprises measurement options. In an embodiment, the measurement options include identification of transmitters whose reference packet the receiver successfully decoded. In an embodiment, the measurement options include a signal-to-noise ratio (SNR) and a received signal strength indication (RSSI) of each of successfully decoded reference packet.

In an embodiment, the scheduling information in a second packet includes a start time of the measurement time window, a duration of the measurement time window, an identification of STAs that are allowed to send reference packet during the measurement time window, and a duration of each reference packet transmission. In an embodiment, the scheduling information in a second packet includes an indication that all STAs assigned in the measurement time window shall send a reference packet during the measurement time window.

In an embodiment, the AP sends an indication that all STAs assigned in a measurement time window shall send a polling packet during the measurement time window. In an embodiment, this is done by assigning one bit information in a packet, wherein the one bit indicates whether all said STAs shall send a polling packet. In an embodiment, the indication that all STAs assigned in the measurement time window shall send a polling packet during the measurement time window is done by assigning two bit information in a packet to a fourth state, wherein the two bit information is composed of four states as follows:

a first state of the two bit information indicates only STA with its traffic indication field set are allowed to perform packet transmission;

a second state of the two bit information indicates only STA with its said traffic indication field set are allowed to perform packet transmission and the measurement time window is reserved for frames with duration smaller than a predefined length;

a third state of the two bit information indicates every STA assigned within the measurement time window is allowed to perform packet transmission; and the fourth state of the two bit information indicates that all STAs assigned within the measurement time window shall perform packet transmission.

FIG. 1 illustrates a network 100 for communicating data. The network 100 comprises an AP 110 having a coverage area 112, a plurality of STAs 120, and a backhaul network 130. As used herein, the term AP may also be referred to as a transmission point (TP) or a base station (BS) and the three terms may be used interchangeably throughout this disclosure. The AP 110 may comprise any component capable of providing wireless access by, inter alia, establishing uplink (UL) (dashed line) and/or downlink (DL) (dotted line) connections with the STAs 120, such as a base transceiver station (BTS), an enhanced base station (eNB), a femtocell, and other wirelessly enabled devices. The STAs 120 may comprise any component capable of establishing a wireless connection with the AP 110. The STAs 120 may also be referred to as user equipment (UEs). Examples of STAs include smart phones, tablet computers, and laptops. The backhaul network 130 may be any component or collection of components that allow data to be exchanged between the AP 110 and a remote end (not shown). In some embodiments, the network 100 may comprise various other wireless devices, such as relays, femtocells, etc.

In an embodiment, the AP 110 organizes a process such that one or more STAs 120 measure the channel quality between nearby STAs 120. The AP 110 organizes the STAs into two groups: measurers (STAs that measure channel quality) and sounders (STAs that transmit reference signals so that measurers can measure the received signal quality). In an embodiment, the group of measurers includes only one STA 120. In an embodiment, the group of measurers includes multiple STAs 120. In an embodiment, the group of sounders includes only one STA 120 and in other embodiments, the group of sounders include multiple STAs 120. The AP 110 assigns a RAW that only sounder STAs 120 are allowed to transmit a reference packet and designates a transmission time for each sounder STA 120 such that no more than one sounder STA 120 will transmit in each time interval. During a given time window, measurer STAs 120 measure the quality of the signal received from each sounder STA 120. After the given time window, the measurer STAs 120 report the measurement results to the AP 110.

Figure 2:
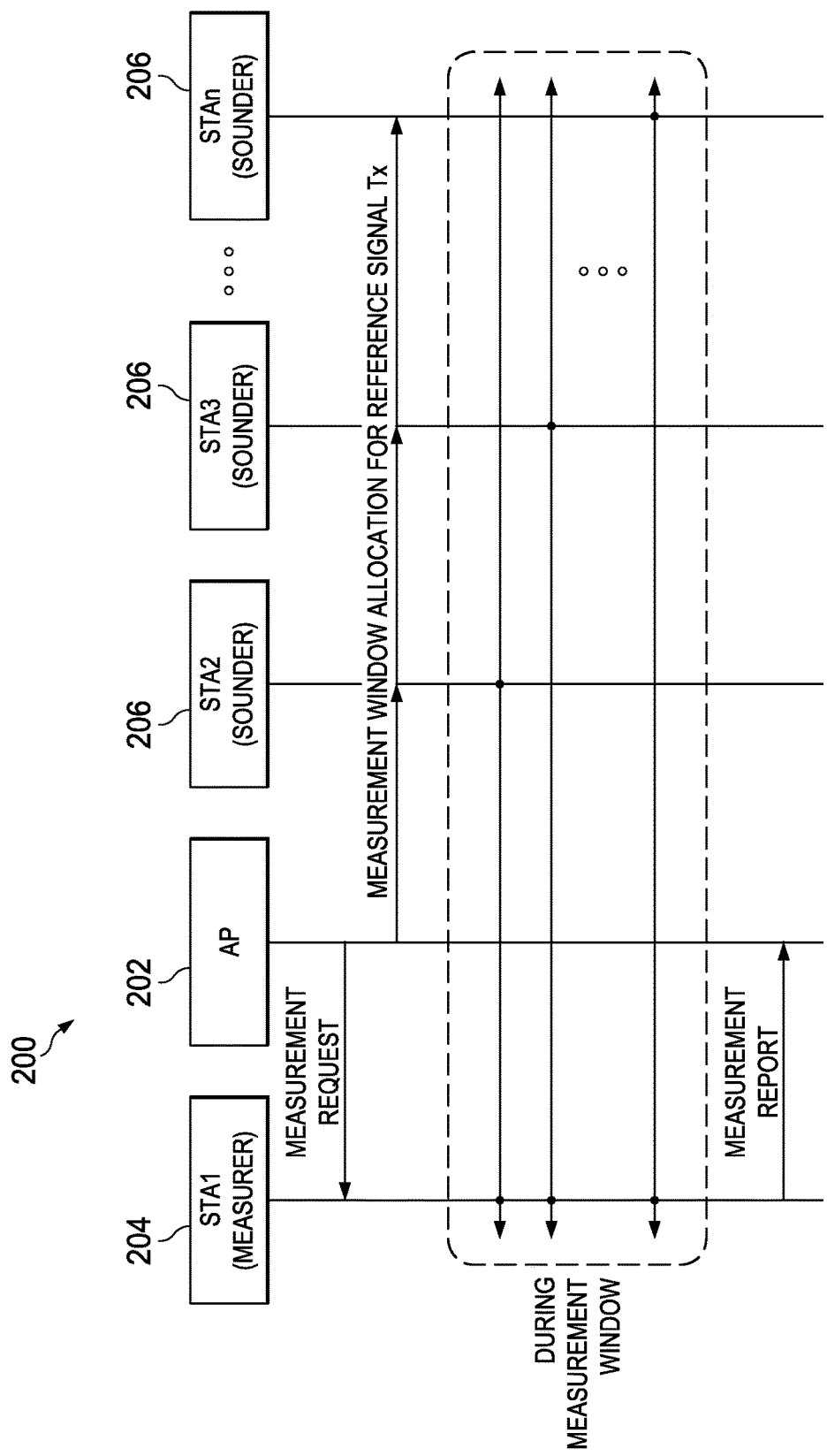
FIG. 2 illustrates a general measurement request procedure for measuring channel quality.

FIG. 2 illustrates a general measurement request procedure 200 for measuring channel quality. A system for implementing the general measurement request procedure 200 includes an AP 202, a measurer STA1 204, and a plurality of sounder STAs 206 labeled as STA2, STA3, and STAn. The AP 202 sends a measurement request to STA1 204. The AP 202 also sends a measurement window allocation for reference signal transmission to the sounder STAs 206. Each sounder STA 206 transmits a reference signal at different times during the measurement window. Following the end of the measurement window, the measurer STA1 204 transmits a measurement report to the AP 202.

A measurement request frame may include the following information: identification of basic service set (BSS), identification of measurer, and information on the measurement window. In case a sounder also is to measure the channel during the measurement window, transmission of the measurement request message to the sounder can be omitted. In this case, the information that the sounder uses to measure the channel is indicated in the measurement window allocation frame. The identification of the BSS is the identification of AP sending this request frame. One possible solution is the use of basic service set identification (BSSID) or an identification (ID) generated by a predefined function of BSSID. The identification of the BSS is for the measurer to identify the device that requested the measurement request frame.

The identification of the measurer is the identification of STAs that are to measure the channel during measurement window. It can be one STA or a group of STAs. In case of single STA, the following information maybe used for this purpose: media access control (MAC) address, Association ID (AID), ID generated by a predefined function of MAC address, and ID generated by a predefined function of AID. In case of multiple STAs, following information can be used for this purpose: MAC address or ID generate by a predefined function of MAC address of each STA, AID or ID generate by a predefined function of AID of each STA, and ID representing group of STAs.

The information on the measurement window indicates the time duration that measurement needs to be done. It can indicate one specific time window or a series of time windows in periodic manner. There can be multiple solutions available for this information.

In a first example solution only information related to start time of the measurement window is indicated. In case of a series of time windows, information related to start time of each measurement window is indicated. (e.g., start time, number of window, and period information). On receiving this information, the measurer listens to the corresponding measurement window allocation frame and gets full information about the window. The measurement window allocation frame is to inform measurers of when to measure a reference signal.

In a second example solution detailed information on the measurement window is indicated such that measurers do not need to listen to the corresponding measurement window allocation frame. This information may include start time of the window, duration of the window, and optionally duration of each sounder's assigned transmission.

The measurement request frame may further include options on measurement and reports. Options on measurement criteria include types of measurement (e.g., signal to noise ratio (SNR) measurement, received signal strength indicator (RSSI) measurement, decoding success/failure). Options on measurement report may include report measurement results for all sounders, or report measurement results for specific sounders (e.g., those sounders where decoding failed, those sounders where decoding succeeded).

Measurement window allocation information is broadcasted by a serving AP and it can be included in a beacon frame. The measurement window allocation information informs sounders of when to transmit sounding signals as well as other information concerning sounding. In some embodiments, the measurement window allocation information may be included in the measurement window allocation frame, but in other embodiments, the AP sends two different messages—one to the measurers and the other to the sounders. This frame may include the following information: information on sounders that are allowed to send reference packet during this measurement window, start time of the measurement window, and duration of the measurement window. This frame may further include the following information: duration of each sounder's assigned transmission, and indication that sounders need to measure the channel during the measurement window. Measurers can also receive this measurement window allocation and identify information on measurement window and corresponding sounders.

The AP can use a specific RAW type (or setting) which is dedicated to the sounders for the purpose of measurement window allocation information. One example of a specific RAW type is a RAW for PS-Poll transmission. It includes a specific RAW type indication. Every STA assigned in this specific RAW type sends a reference packet during the RAW period at its own defined time slot. The RAW group can be defined the same way with current RAW group definition.

The AP can also use a normal RAW type (or setting) but make every STA within the RAW send a reference packet. This uses RAW for power save poll (PS-Poll) or triggering packet transmission. PS-Poll or triggering packet is considered as a reference packet. The RAW group can be defined the same way with current RAW group definition. There are, for example, two ways of using RAW for PS-Poll or triggering packet transmission for this purpose.

In a first method for using RAW for PS-Poll/triggering packet for transmitting reference signals, the AP sets downlink traffic indication map (TIM) bit for all sounders to 1 no matter what the AP has buffered data to each sounder or not, such that every sounder will send PS-Poll frame during the RAW. In case the AP does not have buffered data to specific sounder, the AP set the "more data" bit to 0 at the acknowledgement (ACK) frame in response to the PS-Poll frame. After receiving an ACK frame with "more data" bit set to 0, the sounder can acknowledge that there is no downlink data buffered in AP, and go to sleep state.

In a second method for using RAW for PS-Poll/triggering packet for transmitting reference signals, define 2 bit access right information field which can have 4 different states:

State 1: Only STAs with their TIM bit set to 1 are allowed to perform UL transmission.

State 2: Only STAs with their TIM bit set to 1 are allowed to perform UL transmission, and RAW is reserved for frames with duration smaller than slot duration, such as PS-Poll/trigger frame.

State 3: Every STA within the RAW group is allowed to perform UL transmission.

State 4: All STAs within the RAW group shall perform UL transmission.

This information field is to be "State 4". In case AP does not have buffered data to specific sounder, AP set the "more data" bit to 0 at the ACK frame in response to the PS-Poll frame. After receiving ACK frame with "more data" bit set to 0, the sounder can acknowledge that there is no downlink data buffered in AP, and go to sleep state.

Figure 3:
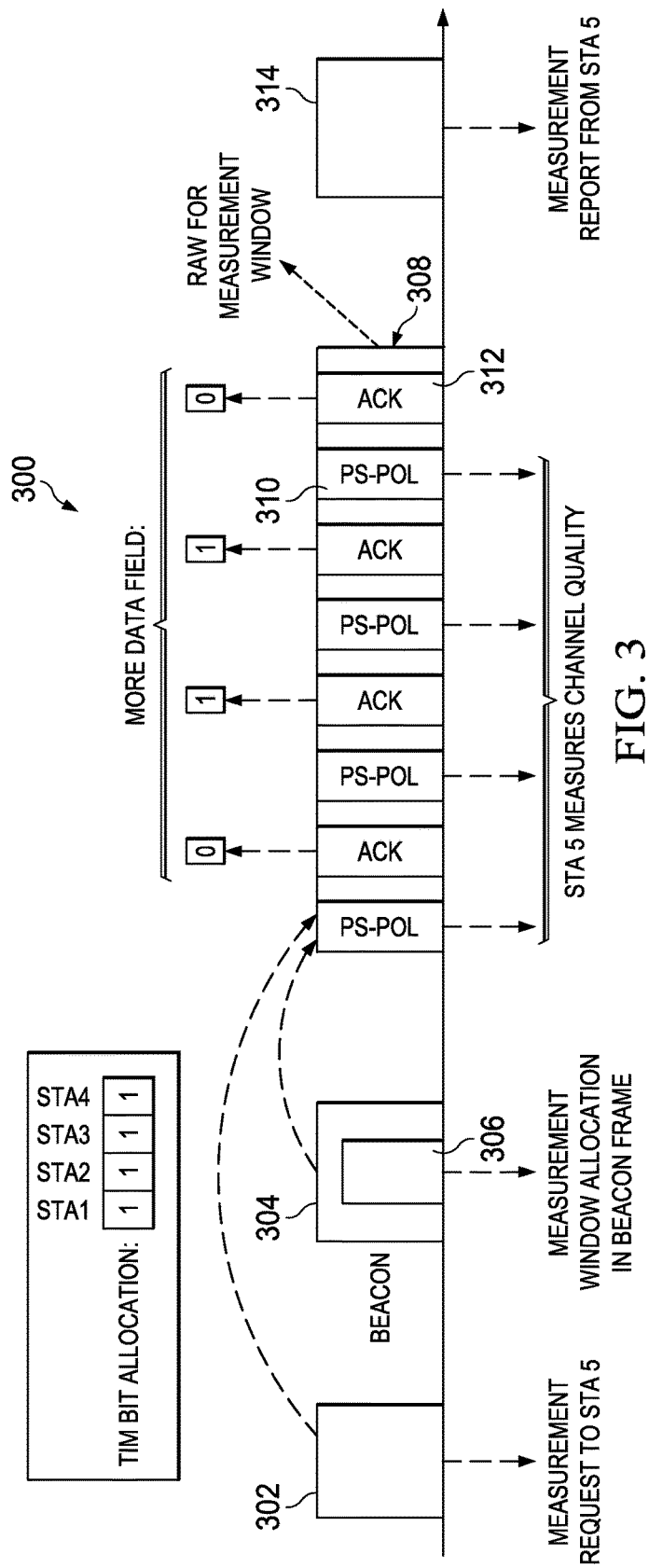
FIG. 3 illustrates an embodiment method for measuring channel quality.

FIG. 3 illustrates an embodiment method 300 for measuring channel quality. Method 300 is a first operation example with the following assumptions. There are 4 STAs assigned to a RAW (STA1~STA4), whose AID is 1~4. The AP has buffered data for STA2 and STA3, and the AP wants another STA (STA5) to listen to signals from all other 4 STAs and report to the AP.

In operation, first the AP sends a measurement request frame 302 to STA5. At the beacon frame 304 that delivers measurement window allocation 306, AP sets TIM for all 4 STAs to 1, which enables all 4 STAs to send PS-Poll frame during RAW period 308. The beacon frame 304 is broadcasted to everyone within the coverage area. Thus, every STA, including STA1 through STA4 will listen to it. All 4 STAs will send PS-Poll 310 at each indicated time, and AP sends back Acknowledgement frame 312 to each PS-Poll frame, with "more data" bit set to "1" for STA2 and STA3, and with "more data" bit set to "0" for STA1 and STA4. STA5 monitors the RAW period 308 and measures the received channel statistics from STA1~STA4. After RAW period, STA5 reports the measurement results 314 to AP. The received channel statistics may include an SNR measurement, a RSSI measurement, and decoding success/ failure. The measurement report may include measurement for all sounders or for specific sounders, such as, for example, those sounders where decoding failed or those sounders where decoding succeeded.

Figure 4:
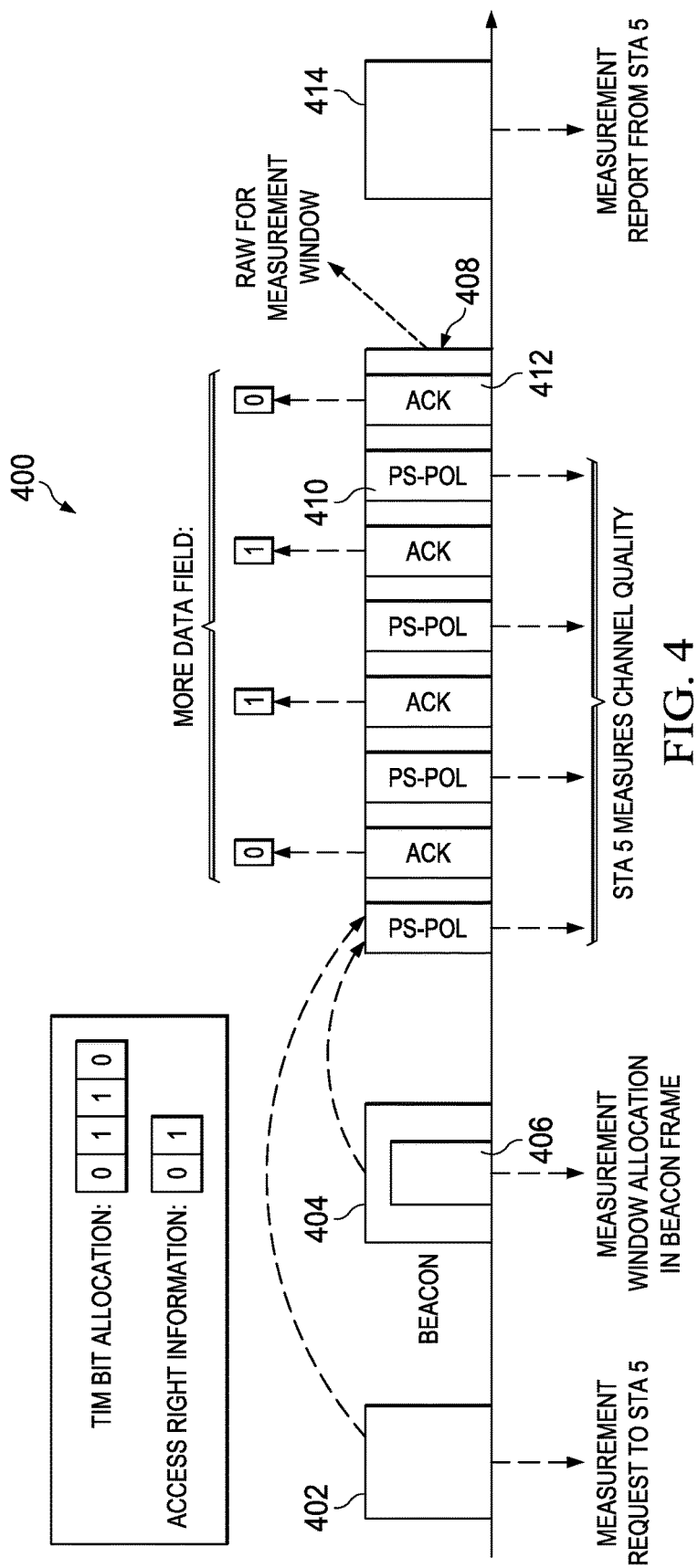
FIG. 4 illustrates an embodiment method for measuring channel quality.

FIG. 4 illustrates an embodiment method 400 for measuring channel quality. Method 400 illustrates a second operation example, under the same assumptions with the first operation example. First, the AP sends a measurement request frame 402 to STA5. At the beacon frame 404 that delivers measurement window allocation 406, AP sets TIM normally depending on existence of buffered data for each STA. And, AP sets "Access right information" bits to a value which corresponds to "All STA within the RAW group shall perform UL transmission." All 4 STAs will send PS-Poll 410 at each indicated time, and AP sends back Acknowledgement frame 412 to each PS-Poll frame 410, with "more data" bit set to "1" for STA2 and STA3, and with "more data" bit set to "0" for STA1 and STA4. STA5 monitors the RAW period 408 and measures the received channel statistics from STA1~STA4. After RAW period 408, STA5 reports the measurement results 414 to AP.

Options for "Access right information" are:
00: Every STA within the RAW group is allowed to perform UL transmission.
01: All STA within the RAW group shall perform UL transmission.
10: only STA with their TIM bit set to 1 are allowed to perform UL transmission.
11: only STA with their TIM bit set to 1 are allowed to perform UL transmission,
and RAW is reserved for frames with duration smaller than slot duration.

Figure 5:
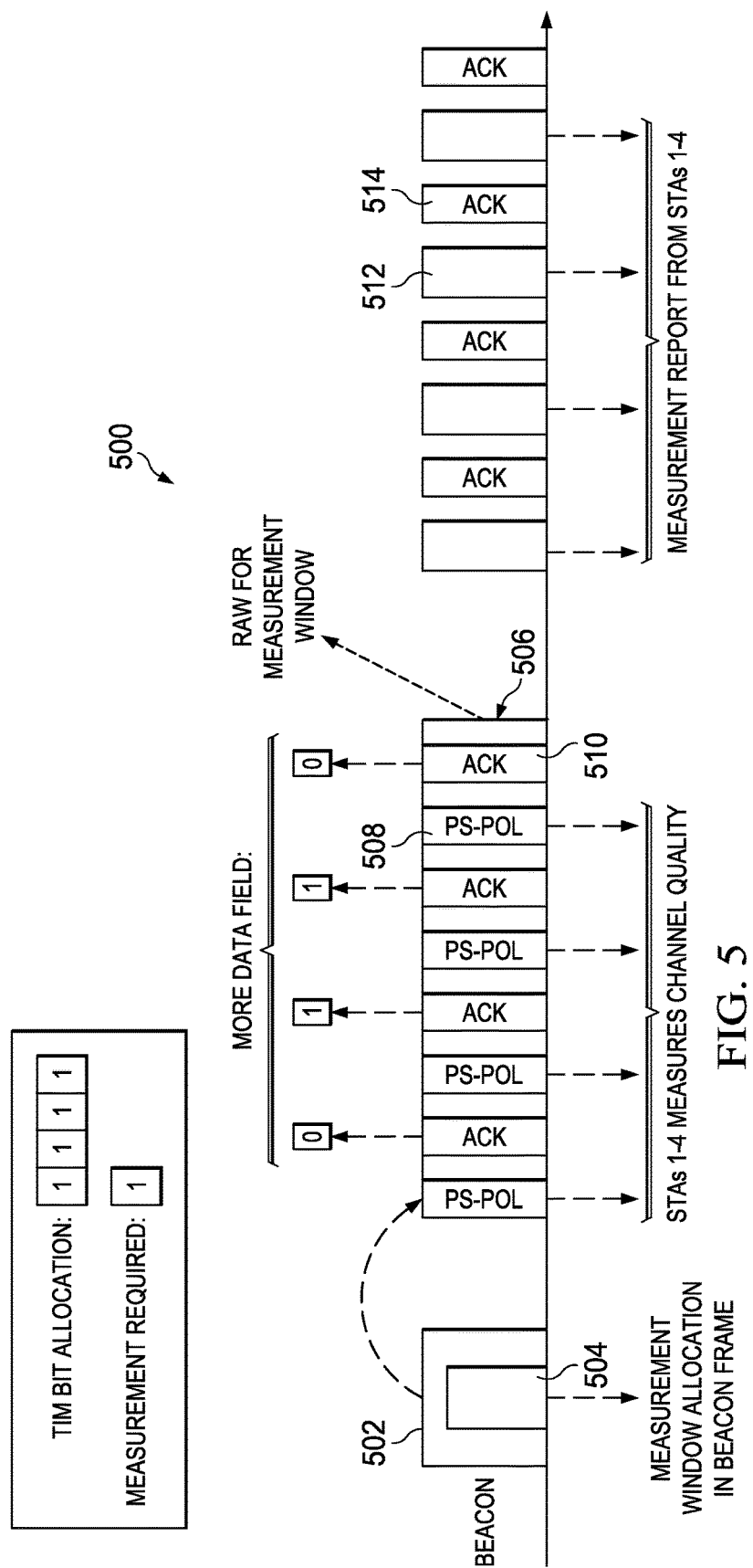
FIG. 5 illustrates an embodiment method for measuring channel quality.

FIG. 5 illustrates an embodiment method 500 for measuring channel quality. Method 500 is a third operation example, which is similar to the first method but where measurers and sounders are the same group. The assumptions include 4 STAs assigned to a RAW (STA1~STA4), whose AID is 1~4, the AP has buffered data for STA2 and STA3, and the AP wants all 4 STAs to listen to signal from all other 3 STAs and report to the AP.

In operation, at the beacon frame 502 that delivers measurement window allocation 504, the AP sets TIM for all 4 STAs to 1, which enables all 4 STAs to send PS-Poll frame 508 during RAW period 506, also AP set "measurement required" bit to "1", which implies that all STAs need to measure other STAs transmission within the measurement window 506. The beacon frame 502 is broadcast to all STAs within the APs coverage area. All 4 STAs will send PS-Poll 508 at each indicated time, and AP sends back Acknowledgement frame 510 to each PS-Poll frame 508, with "more data" bit set to "1" for STA2 and STA3, and with "more data" bit set to "0" for STA1 and STA4. All 4 STAs measure during the RAW period the received channel statistics from other STAs. After RAW period 506, all 4 STAs report the measurement results 512 to AP, which sends an acknowledgement frame 514 to each measurement report.

Options for "Measurement required" are:
0: All STAs need not measure the channel during the RAW.
1: All STAs shall measure the channel during the RAW.

Figure 6:
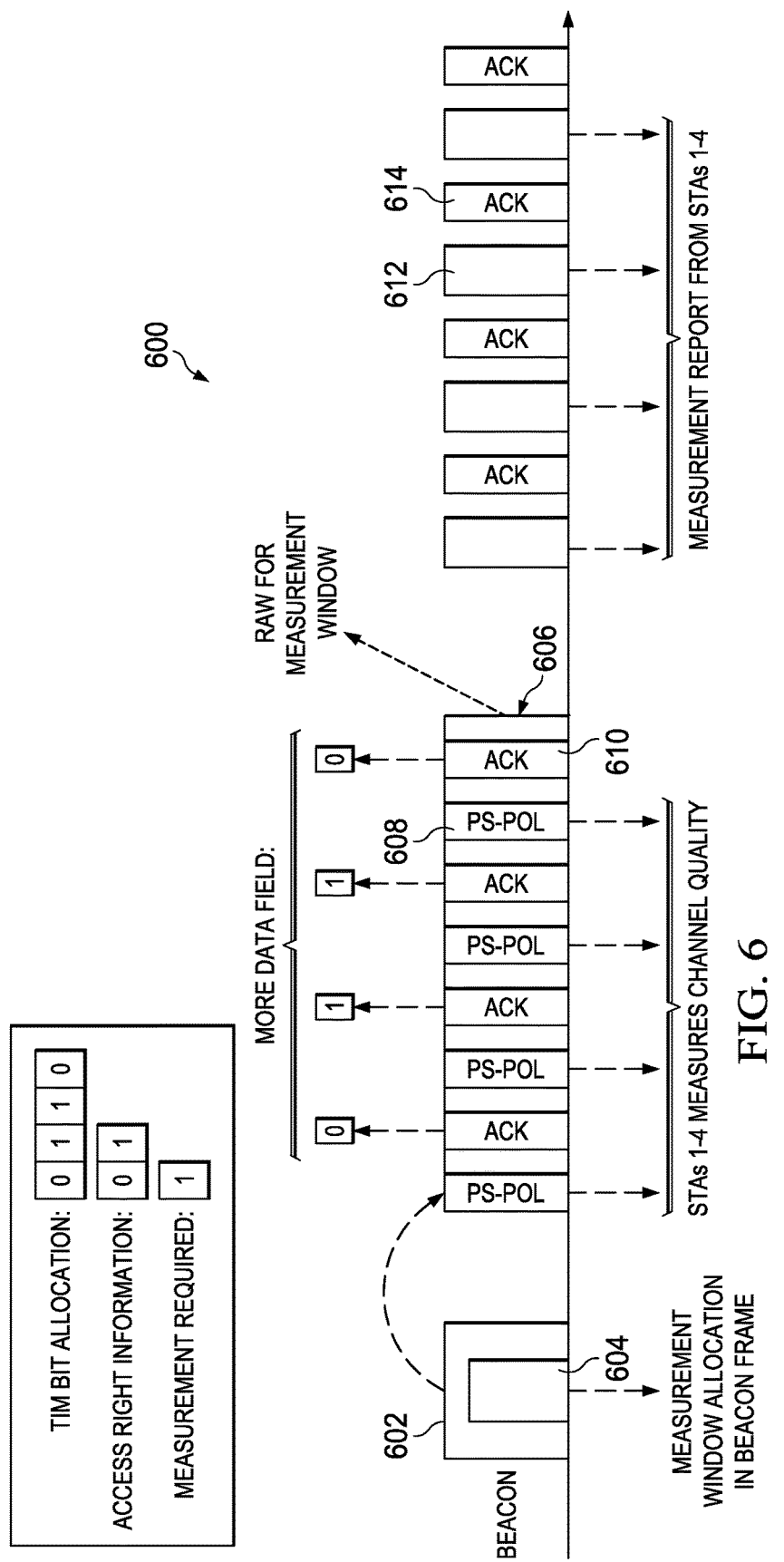
FIG. 6 illustrates a embodiment method for measuring channel quality.

FIG. 6 illustrates an embodiment method 600 for measuring channel quality. Method 600 is a fourth operation example, which is similar to the second method but where measurers and sounders are the same group. Under same assumptions with Operation example 1. At the beacon frame 604 that delivers measurement window allocation 602, AP sets TIM normally depending on existence of buffered data for each STA. AP also sets "Access right information" bits to a value which corresponds to "All STA within the RAW group shall perform UL transmission" and sets "measurement required" bit to "1". All 4 STAs will send PS-Poll 608 at each indicated time, and AP sends back Acknowledgement frame 610 to each PS-Poll frame 608, with "more data" bit set to "1" for STA2 and STA3, and with "more data" bit set to "0" for STA1 and STA4. It should be noted that a UL transmission implies a PS-Poll/trigger frame transmission because this RAW is used only for the PS-Poll/trigger frame. All 4 STAs measure during the RAW period 606 the received channel statistics from other STAs. After RAW period 606, all 4 STAs report the measurement results 612 to AP, which sends an acknowledgement frame 614 to each measurement report.

Figure 7:
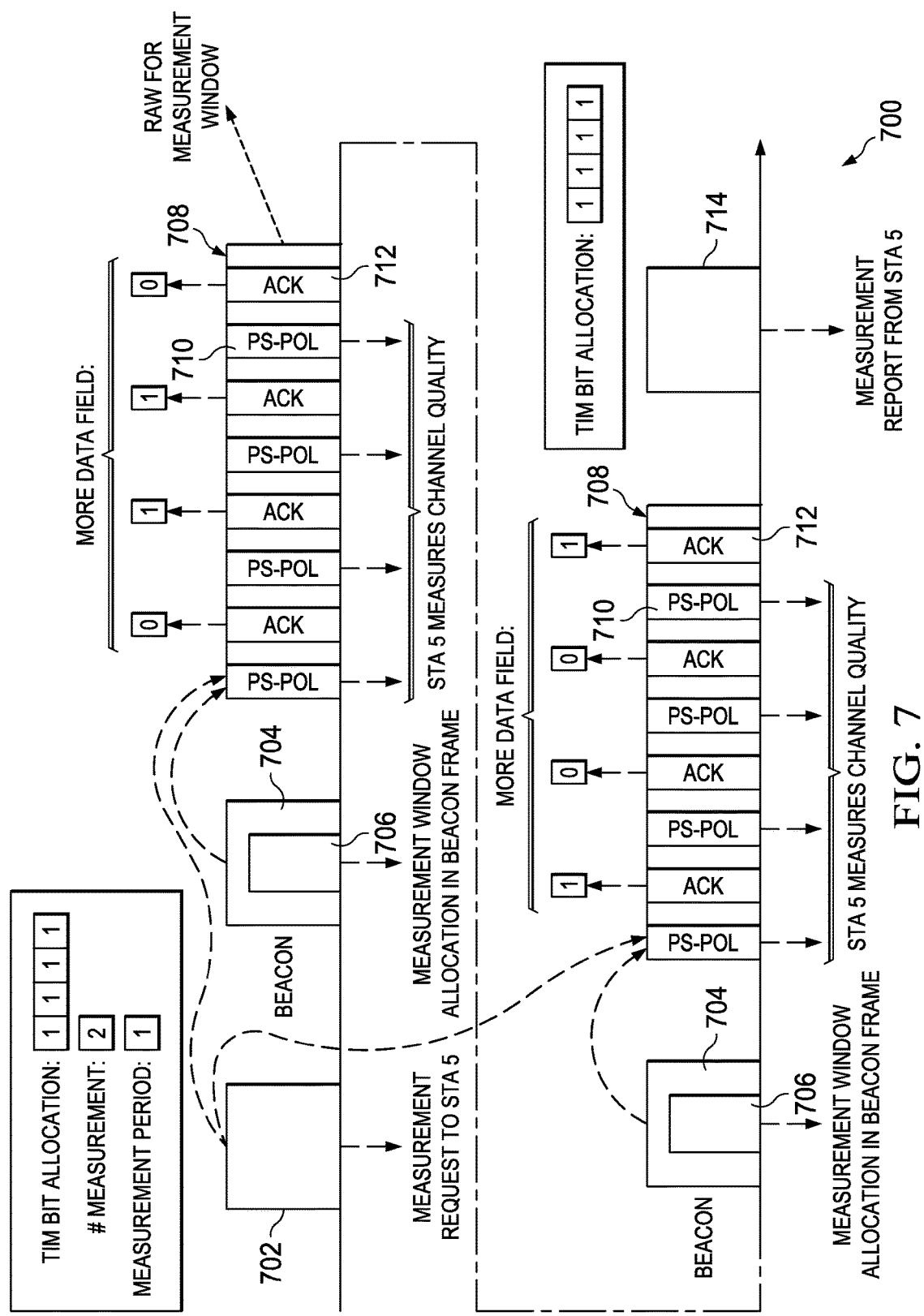
FIG. 7 illustrates a embodiment method for measuring channel quality.

FIG. 7 illustrates an embodiment method 700 for measuring channel quality. Method 700 illustrates a fifth operation example, which is similar to method 1 but with multiple window measurements. Assumptions include 4 STAs assigned to a RAW (STA1~STA4), whose AID is 1~4, the AP has buffered data for STA2 and STA3 at the first beacon frame and STA1 and STA4 at the second beacon frame, and AP wants another STA (STA5) to listen to signal from all other 4 STAs and report to the AP for both first and second beacon frame.

For operation under method 1, first, AP sends a measurement request frame 702 to STA5, which indicates that the STA needs to measure two beacon frames. At each beacon frame 704 that delivers measurement window allocation 706, AP sets TIM for all 4 STAs to 1, which enables all 4 STAs to send PS-Poll frame during RAW period 708. All 4 STAs will send PS-Poll 710 at each indicated time, and AP sends back Acknowledgement frame 712 to each PS-Poll frame, with "more data" bit set to "1" for STA2 and STA3 at the first beacon frame and for STA 1 and STA4 at the second beacon frame. STA5 monitors the RAW period 708 for both beacon frames 704 and measures the received channel statistics from STA1~STA4. After both RAW periods 708, STA5 reports the measurement results to AP. "# measurement" is the number of windows that measurement is needed. "Measurement period" is the period that measurement windows happens in unit of beacon interval.

During the measurement window 708, each sounder sends a reference packet at its allocated time slot. In case wireless channel is busy at the allocated time slot, the sounder may wait until earliest available transmission time and send. Measurers measure the channel during this window and monitor the channel statistics, which can be defined in the measurement request frame.

After measurement window, each measurer sends measurement report 714 to AP. In case a series of measurement windows is defined, a measurer sends a measurement report after all measurement windows defined. One possible embodiment is that a measurement report includes a list of identification for those sounders that a measurer did not correctly decode reference packet. Alternatively, another embodiment is that a measurement report includes a list of identification for those sounders that a measurer decoded reference packet correctly. Or, to have better signaling efficiency, another embodiment is that a measurement report includes an indication on the STA type, and a list of identification for those sounders that belong to the STA type, which can be: sounders that a measurer decoded reference packet correctly, or sounders that a measurer did not correctly decode reference packet.

The AP can identify hidden nodes among STAs within the BSS, therefore AP can have more efficient grouping among STAs, which can reduce packet collision due to hidden node issue. The AP can reuse normal restricted access window allocation for measurement purpose, and thus transmitting a reference frame does not take additional signaling overhead. The measurement STA can identify when target sounder STAs send their reference packet and thus minimize power consumption for measurement STA.

Figure 8:
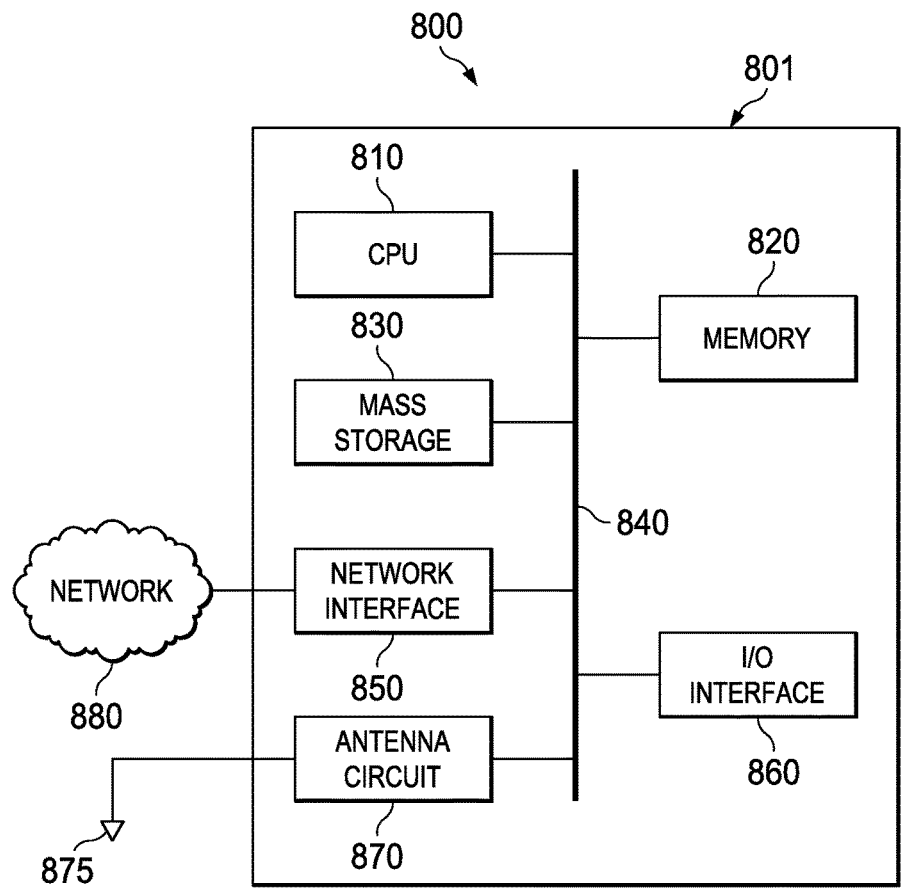
FIG. 8 is a block diagram illustrating a computing platform that may be used for implementing, for example, the devices and methods described herein, in accordance with an embodiment.

FIG. 8 is a block diagram of a processing system 800 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 800 may comprise a processing unit 801 equipped with one or more input/output devices, such as a speaker, microphone, mouse, touchscreen, keypad, keyboard, printer, display, and the like. The processing unit 801 may include a central processing unit (CPU) 810, memory 820, a mass storage device 830, a network interface 850, an I/O interface 860, and an antenna circuit 870 connected to a bus 840. The processing unit 801 also includes an antenna element 875 connected to the antenna circuit.

The bus 840 may be one or more of any type of several bus architectures including a memory bus or memory controller, a peripheral bus, video bus, or the like. The CPU 810 may comprise any type of electronic data processor. The memory 820 may comprise any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs.

The mass storage device 830 may comprise any type of storage device configured to store data, programs, and other information and to make the data, programs, and other information accessible via the bus 840. The mass storage device 830 may comprise, for example, one or more of a solid state drive, hard disk drive, a magnetic disk drive, an optical disk drive, or the like.

The I/O interface 860 may provide interfaces to couple external input and output devices to the processing unit 801. The I/O interface 860 may include a video adapter. Examples of input and output devices may include a display coupled to the video adapter and a mouse/keyboard/printer coupled to the I/O interface. Other devices may be coupled to the processing unit 801 and additional or fewer interface cards may be utilized. For example, a serial interface such as Universal Serial Bus (USB) (not shown) may be used to provide an interface for a printer.

The antenna circuit 870 and antenna element 875 may allow the processing unit 801 to communicate with remote units via a network. In an embodiment, the antenna circuit 870 and antenna element 875 provide access to a wireless wide area network (WAN) and/or to a cellular network, such as Long Term Evolution (LTE), Code Division Multiple Access (CDMA), Wideband CDMA (WCDMA), and Global System for Mobile Communications (GSM) networks. In some embodiments, the antenna circuit 870 and antenna element 875 may also provide Bluetooth and/or WiFi connection to other devices.

The processing unit 801 may also include one or more network interfaces 850, which may comprise wired links, such as an Ethernet cable or the like, and/or wireless links to access nodes or different networks. The network interface 801 allows the processing unit 801 to communicate with remote units via the networks 880. For example, the network interface 850 may provide wireless communication via one or more transmitters/transmit antennas and one or more receivers/receive antennas. In an embodiment, the processing unit 801 is coupled to a local-area network or a wide-area network for data processing and communications with remote devices, such as other processing units, the Internet, remote storage facilities, or the like.

IEEE 802.11-11/0905r5, TGah Functional Requirements and Evaluation Methodology Rev. 5 is related to subject matter of the present application and is incorporated herein by reference in its entirety.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method in a wireless access point (AP) for identifying channel quality between a first group of stations (STAs) and a second group of STAs associated with the AP, wherein each group of STAs comprises at least one STA configured for wireless communication, the method comprising:
   transmitting a first packet to the first group of STAs, wherein the first packet comprises information on a measurement time window within which the first group of STAs is to measure a received signal;
   transmitting one or more second packets to the second group of STAs, wherein each of the second packets includes respective scheduling information for each STA of the second group of STAs to send a reference packet during the measurement time window, wherein only one STA of the second group of STAs is allocated to transmit at each transmission interval within the measurement time window;
   receiving a measurement report from a first STA in the first group of STAs after the measurement time window, wherein the measurement report includes information on received signal quality at the first group of STAs of a signal transmitted by at least one STA from the second group of STAs; and
   identifying a second STA from the first group of STAs that did not correctly decode the reference packet according to the measurement report as a hidden STA from the second group of STAs.

2. The method of claim 1, wherein the first group of STAs and the second group of STAs are the same.

3. The method of claim 1, wherein the first packet and the second packets comprise a single packet, and transmitting a first packet and transmitting one or more second packets comprises a single transmission.

4. The method of claim 1, wherein information on measurement time window in a first packet comprises identification of a serving access point and identification of the first group of STAs.

5. The method of claim 1, wherein information on measurement time window in a first packet further comprises an expected start time and a duration of the measurement time window.

6. The method of claim 1, wherein the reference packet comprises a polling packet, and the polling packet comprises a power save (PS)-Poll frame.

7. The method of claim 6, further comprising transmitting an acknowledgement packet in response to receiving the polling packet, wherein the acknowledgement packet includes an indication of whether there is a buffered data that the AP is prepared to deliver.

8. The method of claim 1, wherein transmitting one or more second packets comprises setting a traffic indication bit for all STAs assigned in the measurement time window, and wherein setting a traffic indication bit for each STA indicates that there is a buffered data that the AP is prepared to deliver to a corresponding STA.

9. The method of claim 8, wherein a Traffic Indication Map (TIM) element is used for the traffic indication bit.

10. The method of claim 1, wherein information on the measurement time window in a first packet further comprises an expected start time of the one or more second packets and identification of the measurement time window within the one or more second packets.

11. The method of claim 1, wherein information on the measurement time window in a first packet further comprises an indication that one specific time window is coming or a series of multiple time windows is coming.

12. The method of claim 11, wherein if a series of multiple time windows is indicated, information on the measurement time window in a first packet further comprises an expected start time of an earliest coming second packet, a number of measurement windows, and a period of the measurement windows.

13. The method of claim 11, wherein if a series of multiple time windows is indicated, information on measurement time window in a first packet further comprises an expected start time of and a duration of each of the measurement time window.

14. The method of claim 1, wherein information on the measurement time window in a first packet further comprises measurement options and the measurement options includes at least one of a signal to noise ratio (SNR) measurement, a received signal strength indicator (RSSI) measurement, a decoding success/failure, measurement report which indicates report measurement results for all sounders, and a measurement report which indicates report measurement results for specific sounders.

15. The method of claim 1, wherein the scheduling information in one of the second packets comprises a start time of the measurement time window, a duration of the measurement time window, an identification of STAs that are allowed to send a reference packet during the measurement time window, and a duration of each reference packet transmission.

16. The method of claim 1, wherein the scheduling information in one of the second packets further comprises an indication that all STAs assigned in the measurement time window shall send a reference packet during the measurement time window.

17. The method of claim 1, wherein a STA assigned to the second group transmits a sounding signal at a time specified by the one or more second packets.

18. The method of claim 17, wherein the STA transmits the sounding signal for a duration of specified by the one or more second packets.

19. The method of claim 1, further comprising:
determining hidden STAs according to the identifying a STA from the first group of STAs that did not correctly decode the reference packet; and
grouping the STAs for data transmission and reception according to the hidden STAs to reduce packet collision.

20. An access point (AP) configured for identifying channel quality between a first group of stations (STAs) and a second group of STAs associated with the AP, wherein each group of STAs comprises at least one STA configured for wireless communication, the AP comprising:
a processor; and
a computer readable storage medium storing programming for execution by the processor, the programming including instructions to:
transmit a first packet to the first group of STAs, wherein the first packet comprises information on a measurement time window within which the first group of STAs is to measure a received signal;
transmit one or more second packets to the second group of STAs, wherein each of the second packets includes respective scheduling information for each of the second group of STAs to send a reference packet during the measurement time window, wherein only one STA of the second group of STAs is allocated to transmit at each transmission interval within the measurement time window;
receive a measurement report from a first STA in the first group of STAs after the measurement time window, wherein the measurement report includes information on received signal quality at the first group of STAs of a signal transmitted by at least one STA from the second group of STAs; and
identify a second STA from the first group of STAs that did not correctly decode the reference packet according to the measurement report as a hidden STA from the second group of STAs.

21. The AP of claim 20, wherein the first packet and the second packets comprise a single packet and transmitting a first packet and transmitting one or more second packets comprises a single transmission.

22. The AP of claim 20, wherein information on measurement time window in a first packet further comprises an expected start time and a duration of the measurement time window.

23. The AP of claim 20, wherein information on the measurement time window in a first packet further comprises an expected start time of the second packet and identification of the measurement time window within the second packet.

24. The AP of claim 20, wherein information on the measurement time window in a first packet further comprises an indication of one specific time window is coming or a series of multiple time windows is coming.

25. The AP of claim 20, wherein the scheduling information in one of the second packets comprises a start time of the measurement time window, a duration of the measurement time window, an identification of STAs that are allowed to send a reference packet during the measurement time window, and a duration of each reference packet transmission.

26. The AP of claim 20, wherein the scheduling information in one of the second packets further comprises an indication that all STAs assigned in the measurement time window shall send a reference packet during the measurement time window.

27. In a wireless communication system including at least one access point (AP) and more than one mobile station (STA) associated with the AP, a method of identifying channel quality among a group of STAs, the method comprising:
transmitting a first packet to the group of STAs, wherein the first packet includes respective scheduling information for each STA of the group of STAs to send a reference packet during a measurement time window, and an indication that at least one STA of the group of STAs needs to measure a received signal quality throughout the measurement time window, wherein only one STA out of the group of STAs is allocated to transmit at each transmission interval within the measurement time window;
receiving a measurement report from a first STA in the group of STAs after said measurement time window, wherein the measurement report includes information on received signal quality at each of the group of STAs which was transmitted by a same group of STAs; and
identifying a second STA that did not correctly decode the reference packet according to the measurement report as a hidden STA from the group of STAs.

28. The method of claim 27, wherein the scheduling information in the first packet comprises a start time of the measurement time window, a duration of the measurement time window, identification of STAs that are allowed to send the reference packet during the measurement time window, and a duration of each reference packet transmission.

29. A network component configured for of identifying channel quality among a group of mobile stations (STAs) comprising:
a processor; and
a computer readable storage medium storing programming for execution by the processor, the programming including instructions to:
transmit a first packet to the group of STAs, wherein the first packet includes respective scheduling information for each STA of the group of STAs to send a reference packet during a measurement time window, and an indication that at least one STA of the group of STAs needs to measure a received signal quality throughout the measurement time window, wherein only one STA out of the group of STAs is allocated to transmit at each transmission interval within the measurement time window; and
receive measurement report from a first STA in the group of STAs after said measurement time window, wherein the measurement report includes information on received signal quality at each of the group of STAs which was transmitted by a same group of STAs; and
identify a second STA that did not correctly decode the reference packet according to the measurement report as a hidden STA from the group of STAs.

30. The network component of claim 29, wherein the scheduling information in the first packet comprises a start time of the measurement time window, a duration of the measurement time window, an identification of STAs that are allowed to send the reference packet during the measurement time window, and a duration of each reference packet transmission.

* * * * *